(12) United States Patent
Man et al.

(10) Patent No.: US 7,958,058 B2
(45) Date of Patent: Jun. 7, 2011

(54) SYSTEM, METHOD, AND SERVICE FOR MIGRATING AN ITEM WITHIN A WORKFLOW PROCESS

(75) Inventors: Kwai Hing Man, Fremont, CA (US); Wai Kei So, Daly City, CA (US)

(73) Assignee: International Business Machines Corporation, Armonk, NY (US)

( * ) Notice: Subject to any disclaimer, the term of this patent is extended or adjusted under 35 U.S.C. 154(b) by 1131 days.

(21) Appl. No.: 11/681,757

(22) Filed: Mar. 2, 2007

(65) Prior Publication Data

US 2008/0215642 A1    Sep. 4, 2008

(51) Int. Cl.
*G06Q 10/00* (2006.01)
(52) U.S. Cl. .................................. 705/301; 705/300
(58) Field of Classification Search .................. None
See application file for complete search history.

(56) References Cited

U.S. PATENT DOCUMENTS

| | | | |
|---|---|---|---|
| 5,758,187 A | 5/1998 | Young | |
| 5,892,969 A | 4/1999 | Young | |
| 6,460,122 B1 | 10/2002 | Otterness et al. | |
| 6,651,165 B1 | 11/2003 | Johnson | |
| 6,851,023 B2 | 2/2005 | Noya et al. | |
| 6,898,667 B2 | 5/2005 | Umberger et al. | |
| 7,062,605 B2 | 6/2006 | Chatterjee et al. | |
| 2002/0186899 A1 | 12/2002 | Bohnenkamp | |
| 2003/0182282 A1* | 9/2003 | Ripley | 707/5 |
| 2004/0133622 A1* | 7/2004 | Clubb et al. | 709/200 |
| 2004/0162824 A1* | 8/2004 | Burns | 707/4 |
| 2006/0095532 A1 | 5/2006 | O'Rourke et al. | |
| 2006/0095661 A1 | 5/2006 | Fleiner et al. | |
| 2006/0112388 A1* | 5/2006 | Taniguchi et al. | 718/100 |
| 2006/0142978 A1* | 6/2006 | Suenbuel et al. | 703/1 |
| 2006/0167838 A1 | 7/2006 | Lacapra | |

OTHER PUBLICATIONS

Zhu et al., Performance Tuning For Content Manager, Redbooks, Jul. 2006, 490 pages, SG24-6949-01, ISBN 0738495646, IBM Corporation.

* cited by examiner

*Primary Examiner* — Jamisue A Plucinski
*Assistant Examiner* — Shaun Sensenig
(74) *Attorney, Agent, or Firm* — Patterson & Sheridan, LLP

(57) ABSTRACT

An item migration system generates a workflow process comprising logical nodes and physical nodes. Candidate physical nodes are associated with the logical nodes. An item generated at an initial logical node within the workflow process is inserted into the workflow and logically migrated to a subsequent logical node. The system determines whether the item requires physical migration based on properties of the item, characteristics of the subsequent logical node, characteristics of candidate physical nodes, and weighting factors applied to the properties and characteristics. If the item requires physical migration, the system selects an optimum target physical node from the candidate physical nodes. The present system migrates the item to the physical location corresponding to the selected physical node. Otherwise, the present system performs logical migration to the logical node without physical migration.

27 Claims, 6 Drawing Sheets

SYSTEM, METHOD, AND SERVICE FOR MIGRATING AN ITEM WITHIN A WORKFLOW PROCESS

FIELD OF THE INVENTION

The present invention generally relates to content management and in particular to workflow processes within a content management system. More specifically, the present invention relates to migrating an item among work nodes within the workflow process.

BACKGROUND OF THE INVENTION

Businesses and other commercial establishments often utilize content management systems to manage items such as documents, images, files, etc. For example, a world wide insurance company manages a tremendous volume of items. Utilizing a content management system is critical for efficiently controlling the flow of items within the insurance company. A workflow process controls the flow of items.

Workflow processes comprise a set of nodes; each node represents a point at which an item requires processing. Using an insurance company as an example, an insurance claim for damages to an automobile may require processing by a claims generating node to accumulate items into a claims file, an adjustor to estimate the cost of repairs, a claims processor to compare the cost of repairs to terms in the insurance policy, and an account representative to authorize payment, for example, for repairs to the automobile and use of a rental vehicle by the client. The claim generator, the adjustor, the claims processor, and the payment authorization are each nodes in the workflow process. The content management system manages a migration of the insurance claim from node to node within the workflow process.

Although conventional workflow management by a content management system has proven to be useful, it would be desirable to present additional improvements. Conventional workflow management comprises moving an item from one node to a next node without regard to properties of the item. Rather than being targeted to a physical destination based on properties of the item or characteristics of the target destination, the item is routed based on a predetermined workflow. Only one location is identified with each node in the workflow. Logically, the item may be routed to a location on the other side of the world. In actuality, the user to which the item is routed is required to fetch the item from a current location.

Additionally, conventional workflow routing deposits the item at one location for a node. Users associated with that node may reside in disparate locations or manage different aspects of the workflow. Consequently, users with different skills or expertise are required to fetch their items from the same node. This approach is inefficient, slow, and time-consuming for the users of the workflow process.

Returning to the example of a workflow process for an insurance company, the claims processing facility for automobiles may be in Atlanta while the claims processing facility for houses is in Dallas. Conventional workflow processes route the claim to a claims adjusting node. The adjustor for automobile claims in Atlanta is required to fetch the claim from the claims adjusting node. However, the adjustor for automobile claims may be very busy due to an unexpected increase in auto accidents. The adjustor for house claims may be available to help with the automobile workload, but the conventional workflow process has no capability for adjusting workflow based on characteristics of the adjustors.

What is therefore needed is a system, a service, a computer program product, and an associated method for migrating an item within a workflow process. Such a method would improve efficiency and response time of a workflow process by migrating items to an optimum location selected from a set of candidate locations. The selection of the optimum location is based on properties associated with the items and characteristics of the node or user to which the item is routed. For example, an item may be routed to different locations within a division based on the skills of the users or workload of the user that will be processing the item. The need for such a solution has heretofore remained unsatisfied.

SUMMARY OF THE INVENTION

The present invention satisfies this need, and presents a system, a service, a computer program product, and an associated method (collectively referred to herein as "the system" or "the present system") for migrating an item within a workflow process.

The present system generates a workflow process. Generating the workflow process comprises creating logical nodes within the workflow process. The workflow process further comprises creating physical nodes and associating a set of candidate physical nodes with the logical nodes. The present system generates an item at an initial logical node within the workflow process. The initial logical node may be any of the logical nodes within the workflow process.

The present system inserts the item into the workflow process at the initial logical node and logically migrates the item to a subsequent logical node in the workflow process. The present system determines whether the item requires physical migration based on properties of the item, characteristics of the subsequent logical node, and characteristics of physical nodes in the set of candidate physical nodes. If the item requires physical migration, the present system selects an optimum target physical node from the set of candidate physical nodes. The present system migrates the item to a physical location corresponding to the selected physical node. Otherwise, the present system performs logical migration to the subsequent logical node without physical migration.

The present system may be embodied in a utility program such as an item migration utility program. The present system also provides a method for a workflow administrator to generate a workflow process by specifying a set of logical nodes and a set of one or more candidate physical nodes associated with each of the logical nodes. The present system also provides a method for the workflow administrator to identify properties of an item and characteristics of logical nodes, physical nodes, or users that may be used to automatically migrate the item through the workflow process. The present system further provides a method for the workflow administrator to identify weighting factors for the properties of an item and characteristics of logical nodes, physical nodes, or users. A user may then invoke the item migration utility to migrate the item through the workflow process.

The properties of the item that may be used to automatically migrate the item comprise context of the item (priority, urgency, quantity, etc.), contents of the item, keywords associated with the item, type of item (document, image, file, etc.), size of the item, location of the item, physical distance from current location of the item to each of the physical nodes in the set of candidate physical nodes, past history of the item, and past history of similar items. The characteristics of a logical node, a physical node, or a user that may be used to automatically migrate the item comprise intended recipient of item at candidate physical nodes, skill of intended recipients, availability of intended recipients, and repositories associated with the candidate physical nodes.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

The following definitions and explanations provide background information pertaining to the technical field of the present invention, and are intended to facilitate the understanding of the present invention without limiting its scope:

Migration: transfer of an item from a node to a subsequent node. Migration comprises logical migration and may comprise physical migration.

Logical Migration: a transfer of an item that does not include physically moving the item. For example, an item may reside on a server and be migrated from one user of the server to another user of the server without moving the item to another physical location.

Physical Migration: a transfer of an item that comprises physically moving the item from a current location to a target location. The target location may be on the same computer system as the current location, physically co-located with the current location, or physically separated from the current location.

Item: any digital object such as, for example, a document, a file, an image, software, computer code, etc.

Logical Node: a node in a workflow process.

Physical Node: a physical location associated with a logical node.

Workflow Process: a set of logical nodes configured to facilitate processing of items according to a predetermined logical flow. Each logical node may comprise one or more associated physical nodes.

Workflow: migration of an item through the workflow process.

Figure 1:
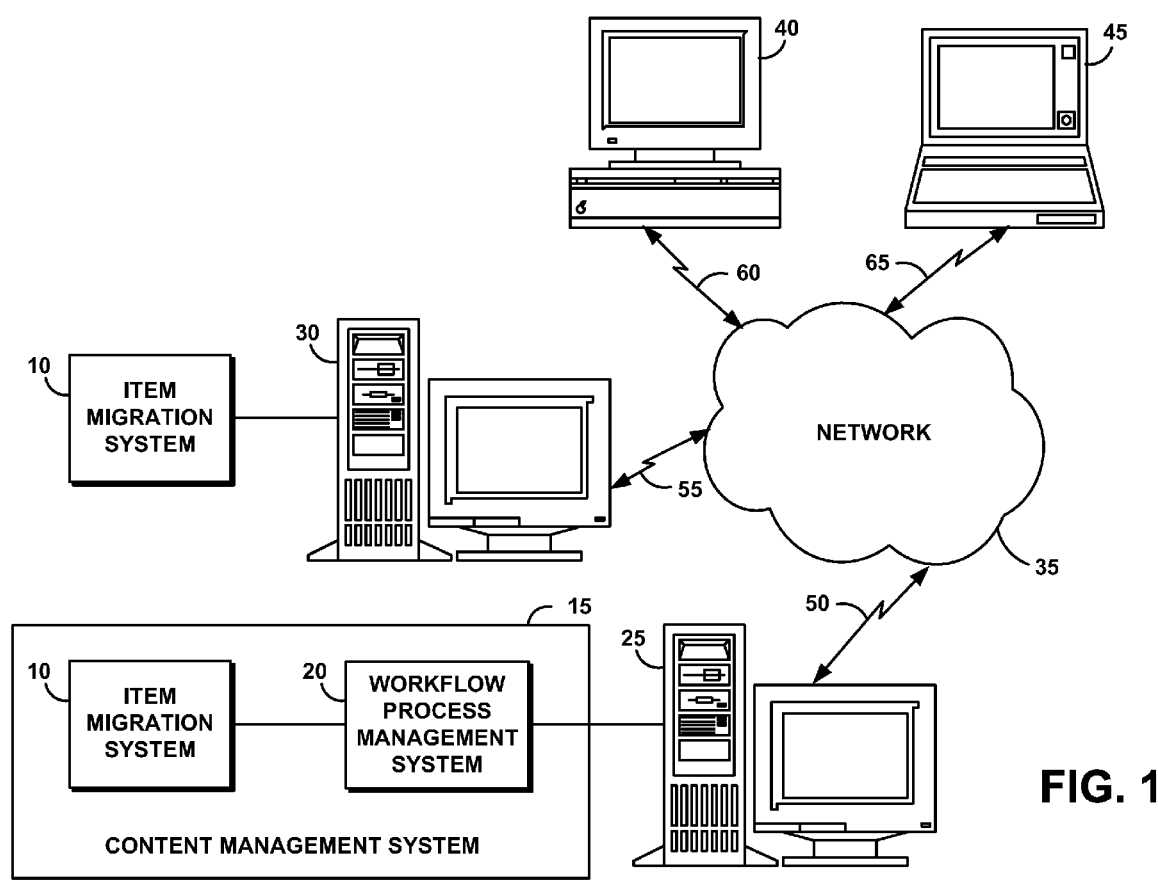
FIG. 1 is a schematic illustration of an exemplary operating environment in which an item migration system of the present invention can be used.

FIG. 1 portrays an exemplary overall environment in which a system, a service, a computer program product, and an associated method (the item migration system 10 or "system 10") for migrating an item within a workflow process according to the present invention may be used. A content management system 15 comprises a workflow process management system 20 and system 10.

System 10 comprises a software programming code or a computer program product that is typically embedded within, or installed on a host server 25. Alternatively, system 10 can be saved on a suitable storage medium such as a diskette, a CD, a hard drive, or like devices. System 10 may be installed in additional servers or computers such as, for example, server 30. While the workflow process management system 20 is shown installed on server 15, the workflow process management system 20 may be distributed across several servers such as server 25 and server 30. Server 25 and server 30 may be co-located or reside in diverse locations. While shown communicating by means of a shared network 35, server 25 and server 30 may communicate by any means such as, for example, a wide-area network, a local area network, the Internet, a dedicated direct connection, etc.

System 10 can take the form of an entirely hardware embodiment, an entirely software embodiment or an embodiment containing both hardware and software elements. In one embodiment, system 10 is implemented in software, which comprises but is not limited to firmware, resident software, microcode, etc.

Furthermore, system 10 can take the form of a computer program product accessible from a computer-usable or computer-readable medium providing program code for use by or in connection with a computer or any instruction execution system. The computer program product comprises the instructions that implement a method of system 10. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium comprise a semiconductor or solid-state memory, magnetic tape, a removable computer diskette, a random access memory (RAM), a read-only memory (ROM), a rigid magnetic disk and an optical disk. Current examples of optical disks comprise compact disk-read only memory (CD-ROM), compact disk-read/write (CD-R/W) and DVD.

A data processing system suitable for storing and/or executing program code comprises at least one processor coupled directly or indirectly to memory elements through a system bus. The memory elements may comprise local memory employed during actual execution of the program code, bulk storage, and cache memories that provide temporary storage of at least some program code to reduce the number of times code is retrieved from bulk storage during execution.

Input/output or I/O devices (comprising but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

Users, such as remote network users, are represented by a variety of computers such as computers 40, 45, and can access the host server 25 through the shared network 35. Computers 40, 45 may also access system 10 on server 30 through the shared network 35. The host server 25, server 30, and computers 40, 45, can be connected to the shared network 35 via communications links 50, 55, 60, 65, respectively. While system 10 is described in terms of the shared network 35, computers 40, 45 may also access system 10 locally rather than remotely. Computers 40, 45 may access system 10 either manually, or automatically through the use of an application.

Figure 2:
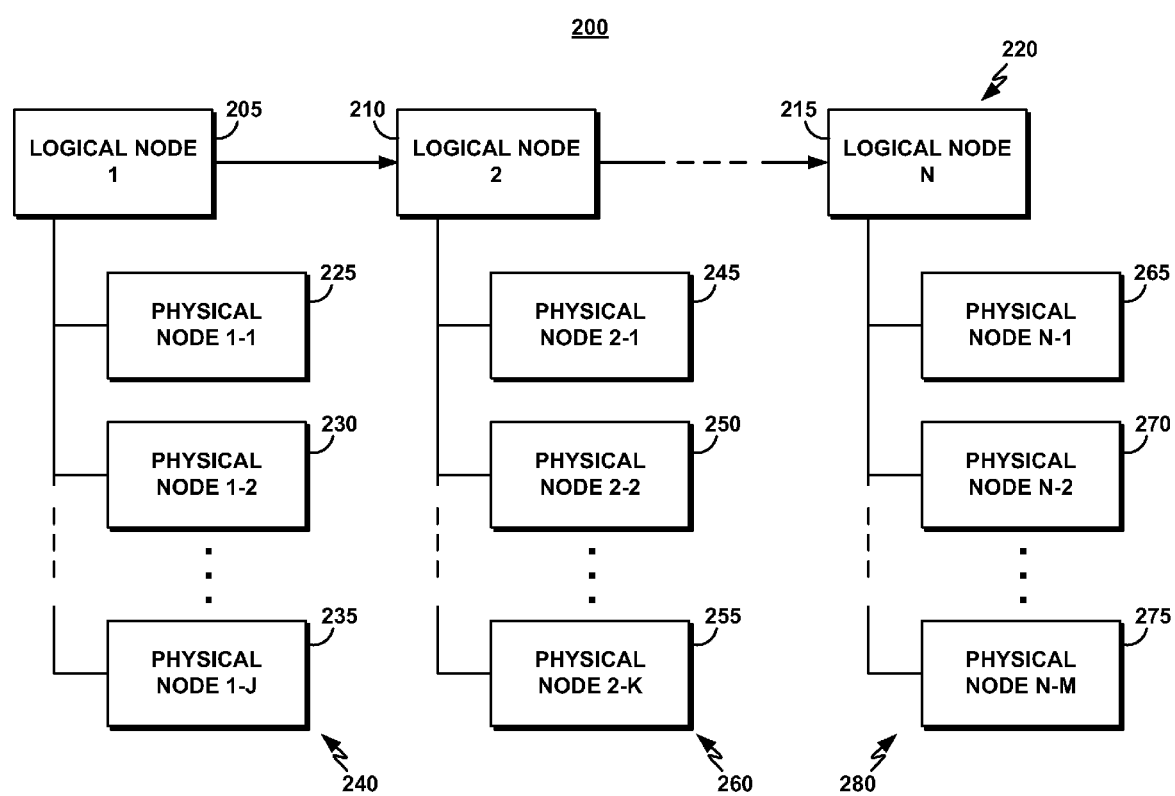
FIG. 2 is a block diagram of the high-level architecture of the item migration system of FIG. 1.

FIG. 2 illustrates a workflow process 200 generated by system 10. The workflow process 200 comprises a logical node 1, 205, a logical node 2, 210, through a logical node N, 215, collectively referenced as logical nodes 220. Each of the logical nodes 220 may have one or more physical locations represented as physical nodes. For example, a physical node 1-1, 225, a physical node 1-2, 230, through a physical node 1-J, 235, (collectively referenced as a set of physical nodes 1, 240) are associated with the logical node 1, 205. The set of physical nodes 1, 240, may comprise 1 to J physical nodes.

A physical node 2-1, 245, a physical node 2-2, 250, through a physical node 2-K, 255, (collectively referenced as a set of physical nodes 2, 260) are associated with the logical node 2, 210. The set of physical nodes 2, 260, may comprise 1 to K physical nodes. A physical node N-1, 265, a physical node N-2, 270, through a physical node N-M, 275 (collectively referenced as a set of physical nodes N, 280) are associated with the logical node N, 215. The set of physical nodes 280 may comprise 1 to M physical nodes.

Physical locations may be duplicated throughout a set of physical locations associated with a logical node; i.e., a physical location may be the same for a subset of the candidate physical locations associated with a logical node. For example, the physical node 1-1, 220, may be the same physical location as the physical node 1-2, 225. Furthermore, physical locations of any of the physical nodes in one set of physical nodes may be duplicated in a different set of physical nodes. For example, the physical node 1-1, 220, may be the same physical location as the physical node 2-2, 250.

Figure 3:
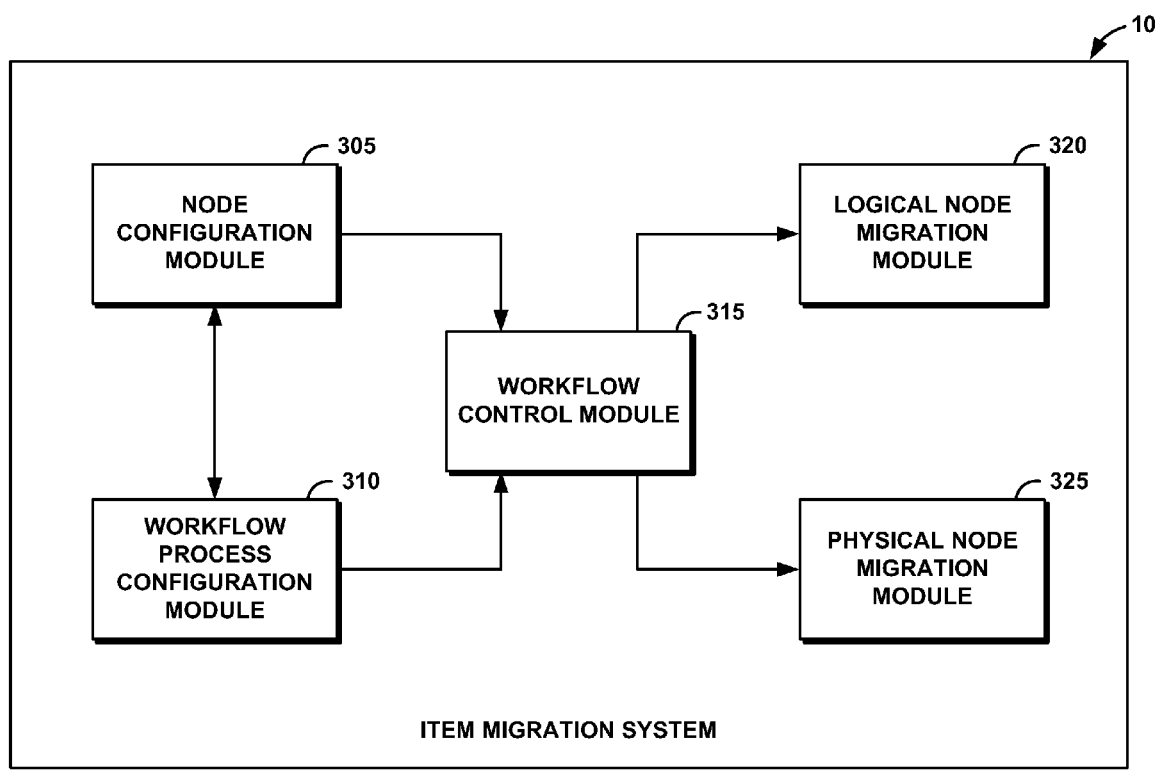
FIG. 3 is a diagram of an exemplary workflow process utilizing the item migration system of FIGS. 1 and 3.

FIG. 3 illustrates a high-level hierarchy of system 10. System 10 comprises a node configuration module 305, a workflow process configuration module 310, a workflow control module 315, a logical node migration module 320, and a physical node migration module 325.

An administrator uses the workflow process configuration module 310 and the node configuration module 305 to configure a workflow process such as the workflow process 200. The workflow process configuration module 310, with direction and input from the administrator, configures logical nodes and physical nodes within the workflow process.

The administrator identifies properties of the items and characteristics of the physical nodes and logical nodes that may be used to migrate an item through the workflow process. Exemplary properties of items comprise, but are not limited to, context of the item (priority, urgency, quantity, etc.), contents of the item, keywords associated with the item, type of item (document, image, file, etc.), size of the item, location of the item, physical distance from a current location of the item to a physical node in a set of candidate physical nodes, past history of the item, past history of similar items, etc. Exemplary characteristics of the logical node and physical nodes comprise, but are not limited to, intended recipient of item at candidate physical node, skill of intended recipients, availability of intended recipients, repositories associated with the candidate physical nodes, etc.

For each property and characteristic, the administrator assigns a weighting factor indicating the relative importance of each of the properties and characteristics. For example, the administrator may assign a weighting factor of 1 to priority and 0.1 to quantity. The weighting factors may be static values or dynamic values. The administrator may manually adjust the weighting factors. In one embodiment, the weighting factors are dynamically adjusted.

The workflow control module 315 controls the workflow, i.e., the migration of an item through the workflow process. Using the logical node migration module 320 and the physical node migration module 325, the workflow control module 315 assesses the properties of the item and the characteristics of candidate physical nodes at a next logical node, and migrates the item to the optimum candidate physical node.

In contrast, conventional workflow processes can assign only one physical location per logical node. Furthermore, conventional workflow processes do not utilize properties of an item or candidate physical locations to migrate the item through the workflow process.

Figure 4:
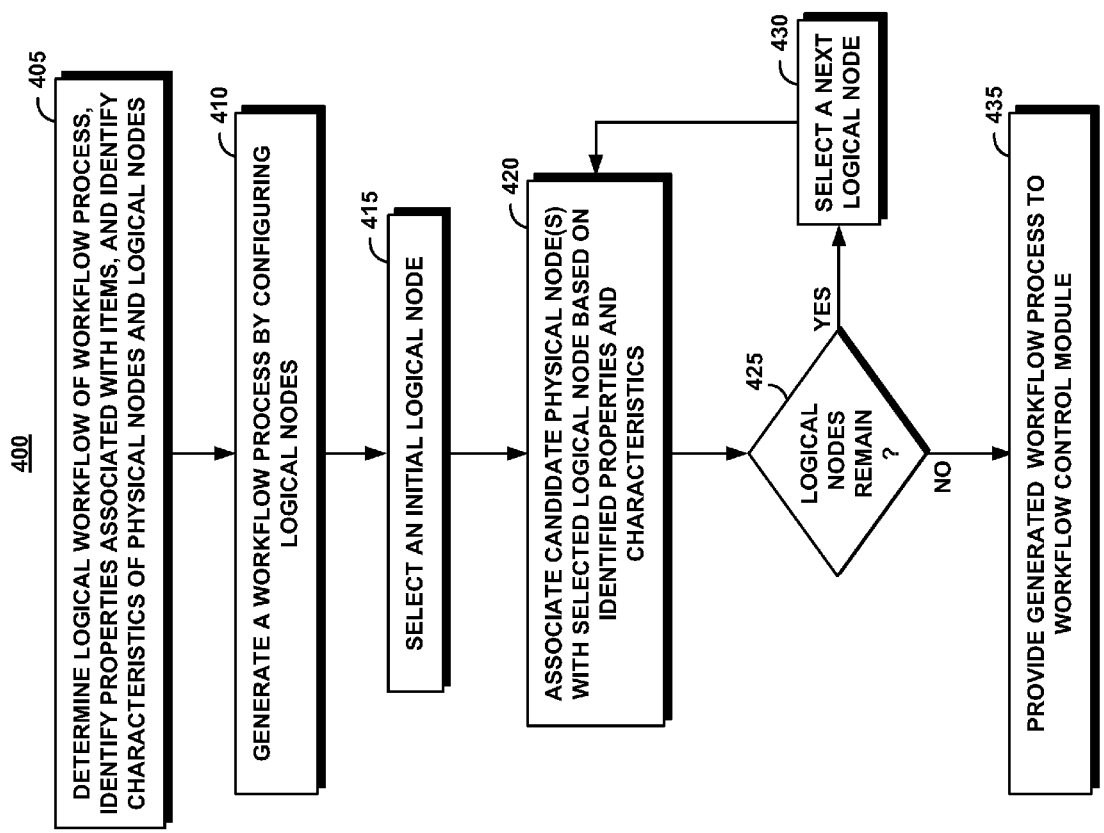
FIG. 4 is a process flow chart illustrating a method of operation of the item migration system of FIGS. 1 and 3 in generating a workflow process.

FIG. 4 illustrates a method 400 of an administrator utilizing the node configuration module 305 and the workflow process configuration module 310. The functions of modules 305 and 310 can be performed either by administrators or by anyone with sufficient privilege. The administrator determines a logical workflow of the workflow process, identifies properties associated with items that are used to migrate items from a logical node to a subsequent logical node, and identifies characteristics of logical nodes and physical nodes (step 405).

The node configuration module 305 generates a workflow process by configuring logical nodes for the workflow process (step 410). The node configuration module 305 selects an initial logical node (step 415). The node configuration module 305 associates candidate physical nodes with the selected logical node based on identified properties and characteristics (step 420). The workflow process configuration module 310 determines whether additional logical nodes remain for processing (decision step 425). If yes, the workflow process configuration module 310 selects a next logical node (step 430) for processing by the node configuration module 305. Otherwise, the workflow process configuration module 305 provides the generated workflow process to the workflow control module 315.

Figure 5:
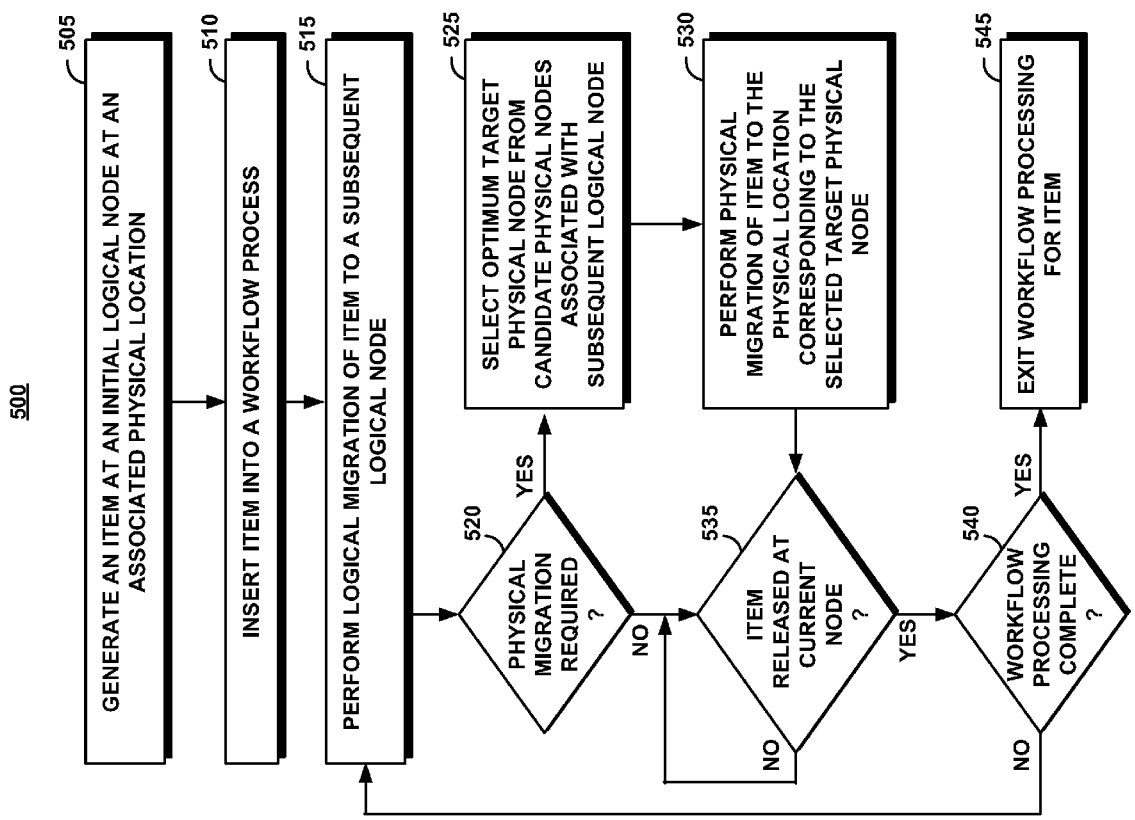
FIG. 5 is a process flow chart illustrating a method of operation of the item migration system of FIGS. 1 and 3 in migrating items through the workflow process.

FIG. 5 illustrates a method 500 of the workflow control module 315, the logical node migration module 320, and the physical node migration module 325 in migrating an item through a workflow process. A user generates an item at an initial logical node at a physical location associated with the initial logical node (step 505). The initial logical node may be any of the logical nodes in a workflow process. The workflow control module 315 inserts the item into a workflow process (step 510). The logical node migration module 320 logically migrates the item to a subsequent logical node (step 515).

The workflow control module 325 determines whether physical migration of the item is required (decision step 520). If yes, the physical node migration module 325 selects an optimum target physical node from candidate physical nodes associated with the subsequent logical node (step 525). The selection is based on properties associated with the item and characteristics of the candidate physical nodes. The physical migration module 325 performs physical migration of the item to the physical location corresponding to the selected target physical node (step 530).

The workflow control module 315 determines whether the item is released for further migration at the current node where the item resides (decision step 535). If no, the workflow control module 315 pauses migration of the item. If yes, the workflow control module 315 determines whether workflow processing is complete for the item (decision step 540). If no, processing returns to step 515 where the logical node migration module 320 migrates the item to a subsequent logical node. If workflow processing is complete (decision step 540), the workflow control module exits workflow processing for the item (step 545).

Figure 6:
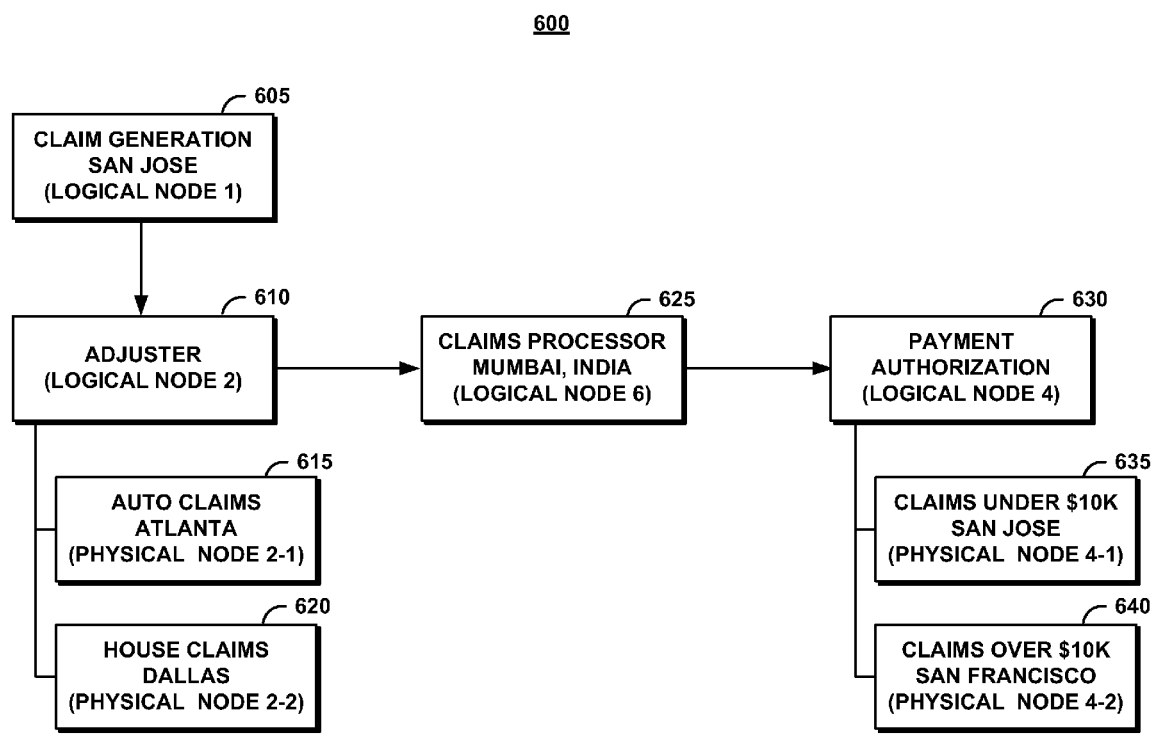
FIG. 6 is a block diagram of an exemplary application of the item migration system of FIGS. 1 and 3 to a workflow process controlling migration of a document within an insurance company.

FIG. 6 illustrates an exemplary workflow process for a simple representation of claims processing for an insurance company in which items are insurance claim files. Referencing step 405 of FIG. 4, the administrator designates value of claim and type of claim as properties of the insurance claim files used to migrate the insurance claim files. The administrator identifies logical nodes as claim generation, determining value of a claim, processing the claim, and authorizing payment for the claim.

The administrator identifies candidate physical locations for determining claim value (adjusting) as an Atlanta office where auto claims are adjusted and a Dallas office where house claims are adjusted. All claims are processed at an outsourcing site in Mumbai, India. The administrator identifies a San Jose office where payments for claims under $10,000 are authorized and a San Francisco office where payments for claims over $10,000 are authorized.

The workflow configuration module 310 designates logical nodes in the workflow process (step 410) as a claim generation 605 (logical node 1), an adjustor 610 (logical node 2), a claims processor 625 (logical node 3), and a payment authorization 630 (logical node 4). Referring to step 425, the node configuration module 305 associates the claim type with the adjustor 610. The node configuration module 305 associates with the adjustor 610 an auto claims 615 in Atlanta (physical node 2-1) and a house claims 620 in Dallas (physical node 2-2). The node configuration module 305 associates claim value with a payment authorization 630. The node configuration module 305 associates with the payment authorization 630 a "claims under $10,000", 635, in San Jose (physical node 4-1) and a "claims over $10,000", 640, in San Francisco (physical node 4-2).

An employee generates an automobile accident claim file at the claim generation 605, located in San Jose (step 505). The logical node migration module 320 migrates the claim file to the adjustor 610. The workflow control module 315 determines whether physical migration of the claim file is required (decision step 520). The claim file corresponds to auto claims, so physical migration is required. The physical node migration module 325 selects the auto claims 615 in Atlanta as the optimum target location (step 525). The physical node migration module 325 migrates the claim file to the auto claims 615 (step 530).

An adjustor at the auto claims 615 values repair to the automobile at $8,000. After the adjustor at the auto claims 615 has finished processing the claim file (decision step 535), the logical node migration module 320 migrates the claim file to claims processing 625 (step 515). The location of the claims processor 625 is different from the location of the auto claims 615; consequently, physical migration is required. The physical node migration module 325 migrates the claim file to Mumbai, India (step 530).

When the claims processor 625 has finished processing the claim file (decision step 535), the logical node migration module 320 migrates the claim file to the payment authorization 630 (step 515). The payment authorization 630 comprises two physical nodes; both are different locations than the claims processor 625. Consequently, physical migration is required (decision step 520).

The physical node migration module 325 determines that the value of the claim is less than $10,000 and selects the claims under $10 k, 635, as the optimum target physical node (step 525). The physical node migration module 325 migrates the claim file to the claims under $10K, 635 (step 530).

It is to be understood that the specific embodiments of the invention that have been described are merely illustrative of certain applications of the principle of the present invention. Numerous modifications may be made to the system, method, and service for migrating an item within a workflow process described herein without departing from the spirit and scope of the present invention.

What is claimed is:

1. A processor implemented method for migrating an item within a workflow process, comprising:
    specifying a plurality of logical nodes within the workflow process, wherein each logical node defines a type of processing performed on the item;
    associating a plurality of physical nodes with the logical nodes to generate the workflow process based on whether the physical nodes perform the type of processing defined by the logical nodes, wherein each physical node has a physical location;
    generating the item;
    inserting the item into the workflow process;
    determining, by one or more computer processors, whether the item requires physical migration;
    upon determination that the item requires physical migration, selecting a target physical node from a set of physical nodes, and physically migrating the item to the physical location of the target physical node, wherein each of the physical nodes in the set of physical nodes is associated with one common logical node; and
    upon determination that physical migration is not required, performing logical migration to a subsequent logical node without physical migration.

2. The method of claim 1, wherein the physical nodes in the set of physical nodes are each associated with different physical locations.

3. The method of claim 2, wherein the item is generated at an initial logical node.

4. The method of claim 3, wherein the item is inserted into the workflow process at the initial logical node.

5. The method of claim 4, wherein determining whether the item requires physical migration includes making a determination based on a plurality of properties of the item.

6. The method of claim 5, wherein determining whether the item requires physical migration includes making a determination based on a plurality of characteristics of a subsequent logical node.

7. The method of claim 6, wherein determining whether the item requires physical migration includes making a determination based on a plurality of characteristics of each of the physical nodes in the set of physical nodes.

8. The method of claim 7, wherein the properties of the item comprise a context of the item.

9. The method of claim 8, wherein the characteristics of the physical nodes in the set of physical nodes and the subsequent logical node comprise any of: an intended recipient of the item at any of the set of candidate physical nodes, a skill of the intended recipient, availability of the intended recipient, and a repository associated with any candidate physical node of the set of candidate physical nodes.

10. The method of claim 7, further comprising applying a weighting factor to each of the properties of the item and each of the characteristics of each of the physical nodes in the set of physical nodes to provide a relative weighting of an importance of each of the properties of the item and each of the characteristics of the physical nodes in determining the target physical node.

11. The method of claim 5, wherein the properties of the item comprise keywords associated with the item.

12. The method of claim 5, wherein the properties of the item comprise a type of the item.

13. A system, comprising:
a computer processor; and
a memory containing a program that, when executed on the computer processor, performs an operation for migrating an item within a workflow process, comprising:
specifying a plurality of logical nodes within the workflow process, wherein each logical node defines a type of processing performed on the item;
associating a plurality of physical nodes with the logical nodes to generate the workflow process based on whether the physical nodes perform the type of processing defined by the logical nodes, wherein each physical node has a physical location;
generating the item;
inserting the item into the workflow process;
determining whether the item requires physical migration;
upon determination that the item requires physical migration, selecting a target physical node from a set of physical nodes, and physically migrating the item to the physical location of the target physical node, wherein each of the physical nodes in the set of physical nodes is associated with one common logical node; and
upon determination that physical migration is not required, performing logical migration to a subsequent logical node without physical migration.

14. The system of claim 13, wherein the physical nodes in the set of physical nodes are each associated with different physical locations.

15. The system of claim 14, wherein the item is generated at an initial logical node.

16. The system of claim 15, wherein the item is inserted into the workflow process at the initial logical node.

17. The system of claim 15, wherein determining whether the item requires physical migration includes making a determination based on a plurality of properties of the item.

18. The system of claim 17, wherein determining whether the item requires physical migration includes making a determination based on a plurality of characteristics of the subsequent logical node.

19. The system of claim 18, wherein determining whether the item requires physical migration includes making a determination based on a plurality of characteristics of each of the physical nodes in the set of physical nodes.

20. The system of claim 19, wherein the properties of the item comprise a context of the item.

21. The system of claim 20, wherein the characteristics of the physical nodes in the set of physical nodes and the subsequent logical node comprise any of: an intended recipient of the item at any of the set of candidate physical nodes, a skill of the intended recipient, availability of the intended recipient, and a repository associated with any candidate physical node of the set of candidate physical nodes.

22. The system of claim 19, further comprising a weighting factor applied to each of the properties of the item and each of the characteristics each of the physical nodes in the set of physical nodes to provide a relative weighting of an importance of each of the properties of the item and each of the characteristics of the physical nodes in determining the target physical node.

23. The system of claim 17, wherein the properties of the item comprise keywords associated with the item.

24. The system of claim 17, wherein the properties of the item comprise a type of the item.

25. A computer program product having a plurality of executable instruction codes stored on a computer usable medium, for migrating an item within a workflow process, comprising:
a set of instruction codes for specifying a plurality of logical nodes within the workflow process, wherein each logical node defines a type of processing performed on the item;
a set of instruction codes for associating a plurality of physical nodes with the logical nodes to generate the workflow process based on whether the physical nodes perform the type of processing defined by the logical nodes, wherein each physical node has a physical location;
a set of instruction codes for generating the item;
a set of instruction codes for inserting the item into the workflow process;
a set of instruction codes for determining whether the item requires physical migration;
a set of instruction codes for selecting a target physical node from a set of physical nodes, and for physically migrating the item to the physical location of the target physical node, upon determination that the item requires physical migration, wherein each of the physical nodes in the set of physical nodes is associated with one common logical node; and
a set of instruction codes for performing logical migration to a subsequent logical node without physical migration, upon determination that physical migration is not required.

26. The computer program product of claim 25, wherein the physical nodes in the set of physical nodes are each associated with different physical locations.

27. A method for migrating an item within a workflow process, comprising:
specifying a plurality of logical nodes, wherein each logical node defines a type of processing performed on the item;
associating a set of at least one of a plurality of physical nodes with each of the logical nodes to generate the workflow process based on whether the physical nodes perform the type of processing defined by each of the logical nodes;
generating the item;
inserting the item into the workflow process;
identifying a plurality of properties of the item, a plurality of characteristics of each of the logical nodes, a plurality of characteristics of each of the physical nodes;
identifying weighting factors for the properties of the item, the characteristics of the logical nodes, and the characteristics of the physical nodes;
invoking an item migration utility, wherein the workflow process, the properties of the item, the weighting factors, the characteristics of the logical nodes, and the characteristics of the physical nodes are made available to the item migration utility to migrate the item, by one or more computer processors, among the logical nodes and the physical nodes in the workflow process.

* * * * *